April 15, 1952     G. D. WUESTE     2,593,379
GATE OPERATOR
Filed Nov. 14, 1949     3 Sheets-Sheet 1
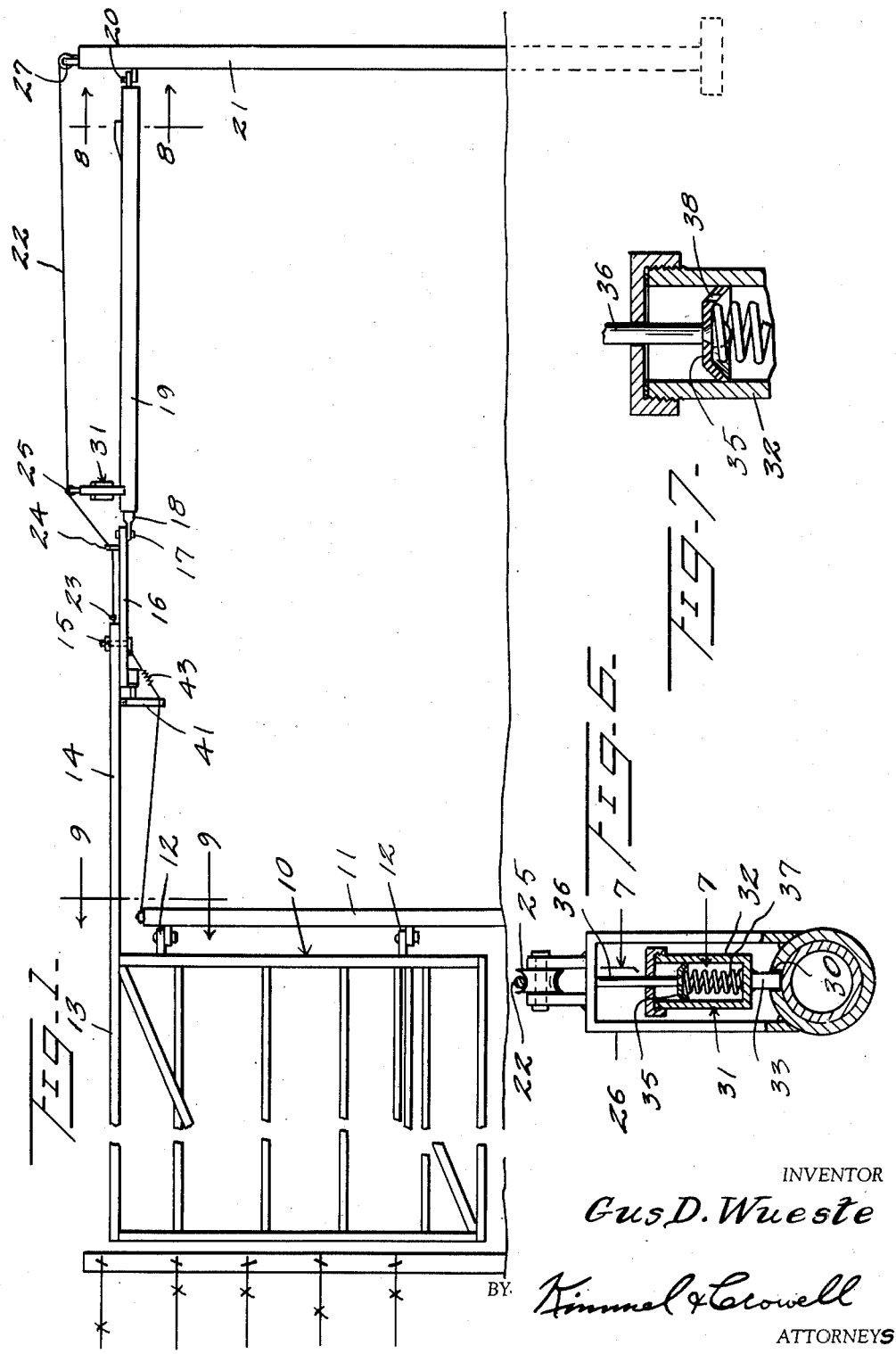
INVENTOR
Gus D. Wueste
BY Kimmel & Crowell
ATTORNEYS

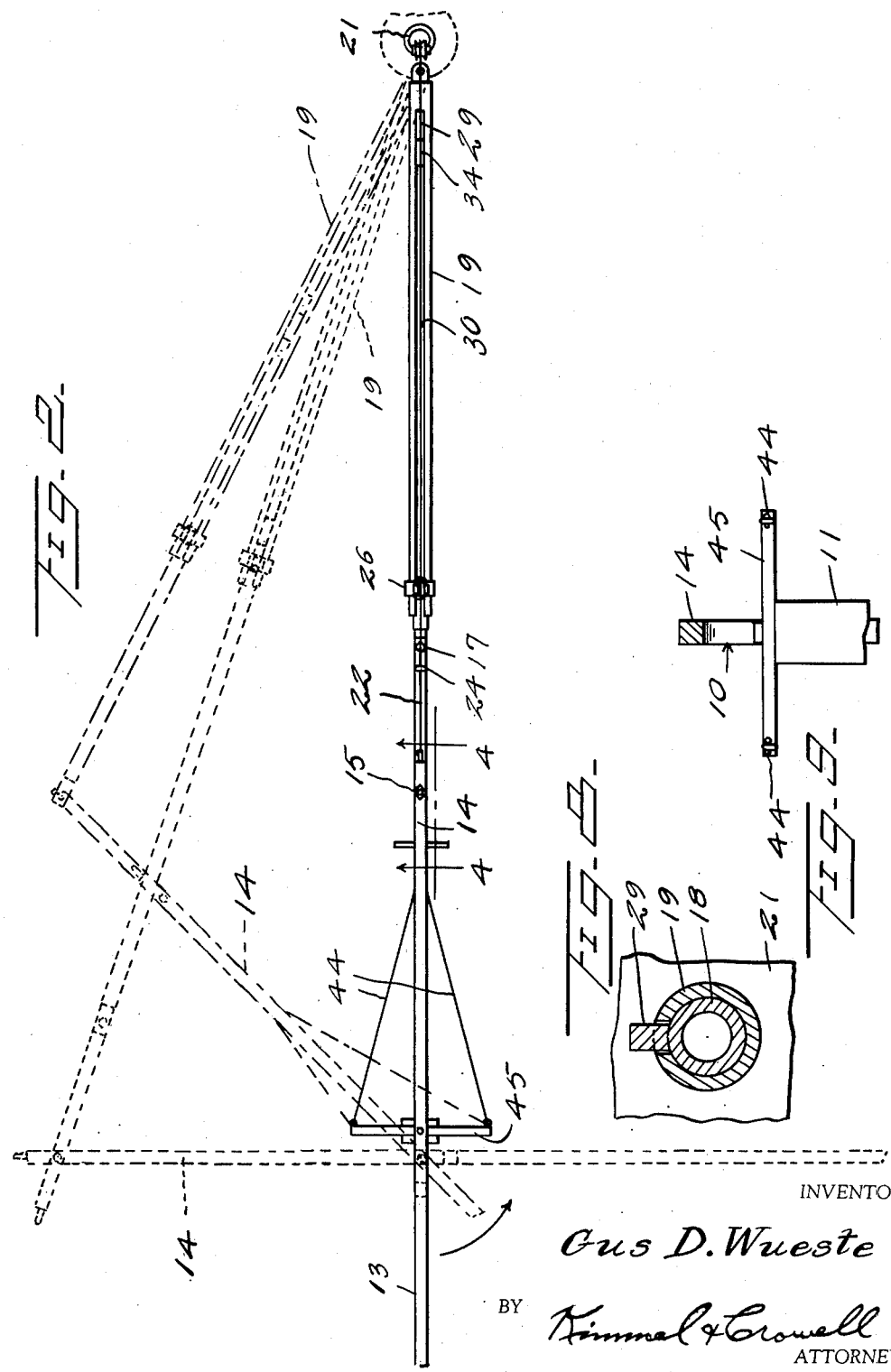

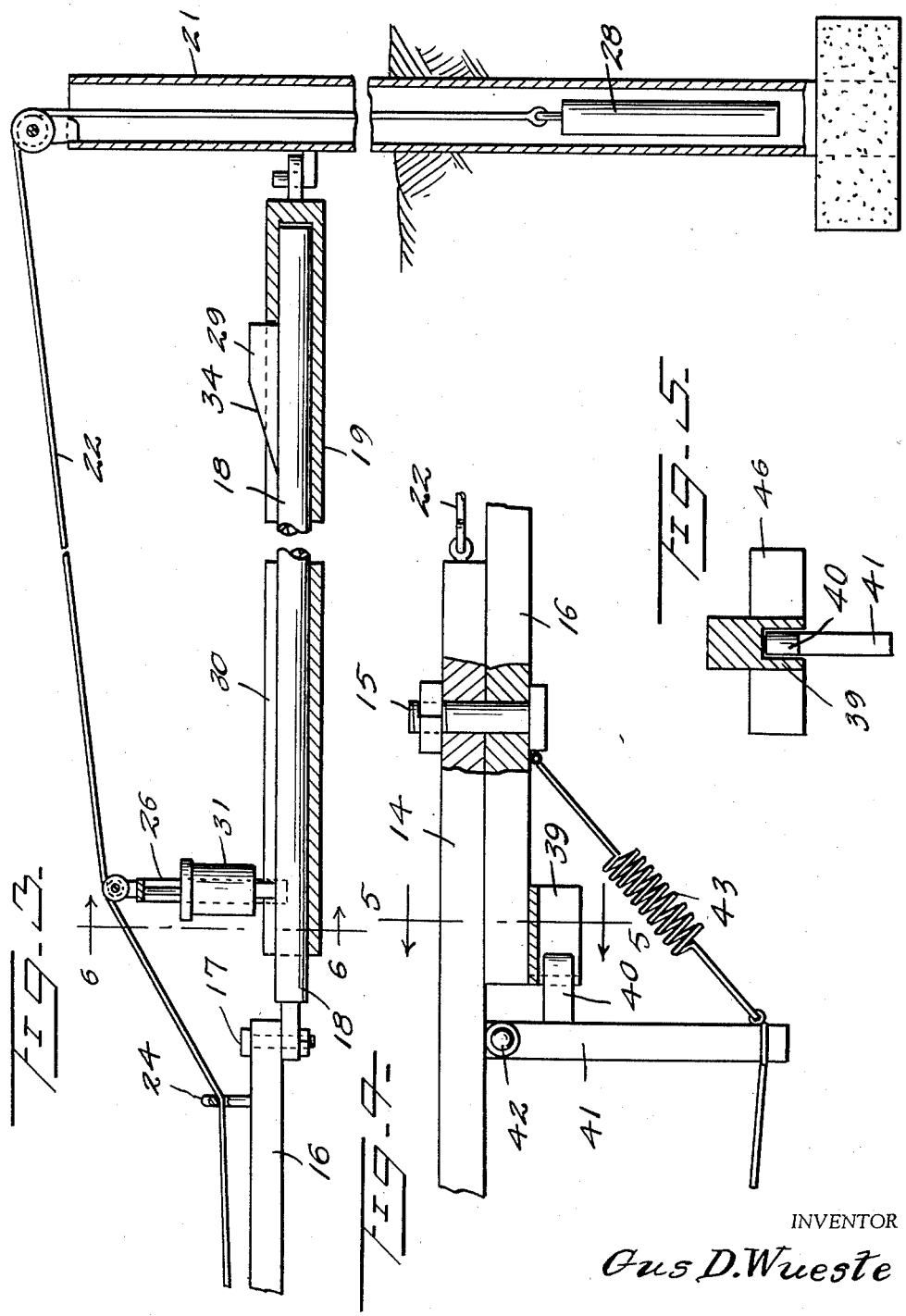

Patented Apr. 15, 1952

2,593,379

UNITED STATES PATENT OFFICE 2,593,379

GATE OPERATOR

Gus D. Wueste, San Antonio, Tex.

Application November 14, 1949, Serial No. 126,973

5 Claims. (Cl. 39—23)

This invention relates to gate operators.

An object of this invention is to provide in a swinging gate structure means whereby the gate may be pushed open and held in open position to permit a vehicle to pass through, the gate having means whereby the gate will be swung to closed position.

Another object of this invention is to provide an improved gate operator which includes a weight connected through a cable to a lever and extensible linkage to the gate, the linkage including a dashpot braking means for holding the gate in open position.

With the above and other objects in view, my invention consists in the arrangement, combination and details of construction disclosed in the drawings and specification, and then more particularly pointed out in the appended claims.

In the drawings,

Figure 1 is a detail side elevation of a gate operator constructed according to an embodiment of this invention, Figure 2 is a plan view of the device showing in dotted and dot and dash lines the several positions of the gate and operator, Figure 3 is an enlarged fragmentary vertical section of the gate operator, Figure 4 is an enlarged fragmentary sectional view taken on the line 4—4 of Figure 2, Figure 5 is a fragmentary sectional view taken on the line 5—5 of Figure 4, Figure 6 is a further enlarged fragmentary sectional view taken on the line 6—6 of Figure 3, Figure 7 is a further enlarged fragmentary sectional view taken on the line 7—7 of Figure 6, Figure 8 is an enlarged sectional view taken on the line 8—8 of Figure 1, Figure 9 is an enlarged fragmentary sectional view taken on the line 9—9 of Figure 1.

Referring to the drawings, the numeral 10 designates generally a gate structure which is swingably mounted on a post 11 by means of hinge members 12. The gate 10 includes a top bar 13 which is formed with an extension lever 14 projecting from the post 11. The lever 14 has secured thereto by means of a pivot bolt 15 an extension link member 16 and the link member 16 is pivotally connected by means of a pivot 17 to a telescoping arm 18. The arm 18 telescopes into an elongated tubular member 19 which is pivotally mounted at its rear end to a pivot member 20 which is carried by an upright tubular post 21.

A cable 22 is secured as at 23 to the rear end of the lever 14 and loosely engages through a guide eye 24 which is carried by the link 16. The cable 22 extends upwardly and rearwardly from the guide 24, engaging over a grooved pulley 25 which is carried by a U-shaped support 26. The support 26 is fixed to the tubular member 19 adjacent the forward or outer end of the latter. The cable 22 extends rearwardly from the pulley 25 and engages over a pulley 27 which is mounted on the upper end of the tubular post 21.

A weight 28 is fixed to the rear end of the cable 22 and loosely engages in the tubular post 21 as shown in Figure 3. The weight 28 provides a means whereby the gate 10 will be constantly urged to a closed position.

The inner member 18 which is slidable in the outer member 19 has fixed thereto a key 29 which loosely engages in the longitudinally extending slot 30 formed in the upper side of the tubular member 19. The key 29 is adapted, as will be hereinafter described, to provide a means whereby the gate 10 will be frictionally held in open position.

A brake member generally designated as 31 is mounted between the U-shaped support 26 and includes a cylinder 32 which has fixed thereto a downwardly extending key engaging member 33. The key engaging member 33 loosely engages in the slot 30 and is adapted to be moved upwardly by the sloping or cam surface 34 at the forward portion of the key 29.

A piston 35 is disposed within the cylinder 32 and is fixed to a depending rod 36 which is secured to the bight of the inverted U-shaped member 26. A spring 37 is interposed between the lower side of the piston 35 and the lower head or wall of the cylinder 32, and constantly urges the cylinder downwardly to braking position. The cylinder 32 with the piston 35 constitutes a dashpot which is adapted to retard the upward movement of cylinder 32 under the action of the cam surface 34. The piston 35 is formed with a relatively small opening 38 whereby the air or liquid within the cylinder 32 may be permitted to flow to either end of the cylinder 32 and the size of the small opening predetermines the length of time the gate will remain in the open position.

The gate 10 is adapted to be releasably locked in its closed position with the lever arms 14 and 16 in alignment with the telescoped members 18 and 19, by means of a releasable latch structure which includes an inverted U-shaped keeper 39 which is carried by the extension link 16 adjacent the forward end of the latter.

A locking bolt 40 is fixed to a depending latch operating lever 41 pivotally mounted as at 42 on the lever 14. A spring 43 is secured between the lower end of the latching lever 41 and the pivot bolt 15.

A pair of forwardly divergent cables 44 are secured to the lower portion of latch lever 41 and are also secured to the opposite ends of a horizontally disposed bar 45 which is fixedly secured to the upper end of the gate post 12. The keeper 39 also includes a pair of oppositely extending wings 46 against one of which the bolt 40 is adapted to initially engage at the time the gate is moving to a closed position, and extension link 16 is swinging to a position aligning with lever 14 and telescoping lever members 18 and 19.

In the use and operation of this gate structure, the gate 10 is adapted to be pushed from a closed position shown in full lines in Figure 2, to an open position. As gate 10 moves to a point substantially 45° out of closed position, latching bolt 40 will be pulled by one of the latch operating cables 44 to a released position with respect to keeper 39. With latch member 40 in released position, extension link 16 is free to pivot on pivot bolt 15 and will then swing to a position in substantial alignment with extension lever members 18 and 19. When gate 10 is swung to a full open position, key or cam member 29 will force dashpot cylinder 32 upwardly and the friction between brake member 33 and cam member 29 will overcome the pull of weight 28 and thereby hold the gate in open position. The gate may be closed by pulling the gate from the dotted line position shown in Figure 2 to a slight angle from the full open position so that cam member 29 will be released from dashpot or brake structure 31. When cam member 29 is disengaged from the dashpot 31, weight 28 will then pull gate 10 to a closed position and as gate 10 nears a closed position, locking bolt 40 will engage an adjacent wing 46 carried by keeper 39 and will slide along this wing 46 until levers 14 and 16 are in alignment with telescoping levers 18 and 19.

I do not mean to confine myself to the exact details of construction herein disclosed but claim all variations falling within the purview of the appended claims.

What I claim is:

1. In a swinging gate, a link, a lever pivotally connected adjacent one end to said link and extending from said link, an extensible lever pivotally connected at one end thereof to the other end of said link, a post spaced from said gate, means pivotally securing said extensible lever to said post, releasable latching means for holding said first mentioned lever and said link in alignment to thereby maintain the gate closed, and means constantly urging the gate to closed position.

2. In a swinging gate, a lever fixed at one end to said gate with an opposite end extended therefrom, an extension member pivotally carried by the opposite end of said lever, a pair of telescoping members, means pivotally connecting one of said pair of telescoping members to said extension member, a post, means pivotally securing the other one of said pair of telescoping members to said post, releasable latching means for holding said extension member in alignment with said lever for at least a portion of the swinging movement of said lever, said latching means being so constructed and arranged that said extension member may swing relative to said lever when the latter has swung with the gate to partly open position, and means constantly urging said gate to closed position.

3. In a swinging gate, a link, a lever pivotally connected adjacent one end to said link and extending from said link, an extensible lever pivotally connected at one end thereof to the other end of said link, a post spaced from said gate, means pivotally securing said extensible lever to said post, releasable latching means for holding said first mentioned lever and said link in alignment to thereby maintain the gate closed, brake means for holding said gate in open position, and means constantly urging the gate to closed position.

4. In a swinging gate, a lever fixed at one end to said gate with an opposite end extended therefrom, an extension member pivotally carried by the opposite end of said lever, a pair of telescoping members, means pivotally connecting one of said pair of telescoping members to said extension member, a post, means pivotally securing the other one of said pair of telescoping members to said post, releasable latching means for holding said extension member in alignment with said lever for at least a portion of the swinging movement of said lever, said latching means bein so constructed and arranged that said extension member may swing relative to said lever when the latter has swung with the gate to partly open position, brake means engaging between said telescoping members for holding said gate in open position, and means constantly urging said gate to closed position.

5. In a swinging gate, a lever fixed at one end to said gate with an opposite end extended therefrom, an extension member pivotally carried by the opposite end of said lever, a pair of telescoping members, means pivotally connecting one of said pair of telescoping members to said extension member, a post, means pivotally securing the other one of said pair of telescoping members to said post, releasable latching means for holding said extension member in alignment with said lever for at least a portion of the swinging movement of said lever, said latching means being so constructed and arranged that said extension member may swing relatively to said lever when the latter has swung with the gate to partly open position, a dashpot carried by one of said pair of telescoping members, a cam carried by the other one of said pair of telescoping members engageable with said dashpot when the gate is in open position and said pair of members are in extended position to thereby frictionally hold the gate in open position, and means constantly urging said gate to closed position.

GUS D. WUESTE.

REFERENCES CITED

The following references are of record in the file of this patent:

UNITED STATES PATENTS

| Number | Name | Date |
|---|---|---|
| 189,814 | Tinsley | Apr. 17, 1877 |
| 827,771 | Worland | Aug. 7, 1906 |
| 907,924 | Watson | Dec. 29, 1908 |
| 1,171,692 | Benigar | Feb. 15, 1916 |